Figure 1:
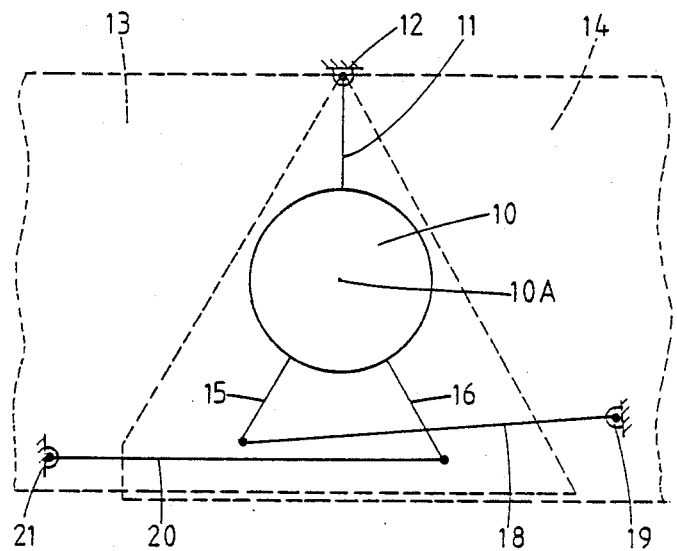
Figure 2:
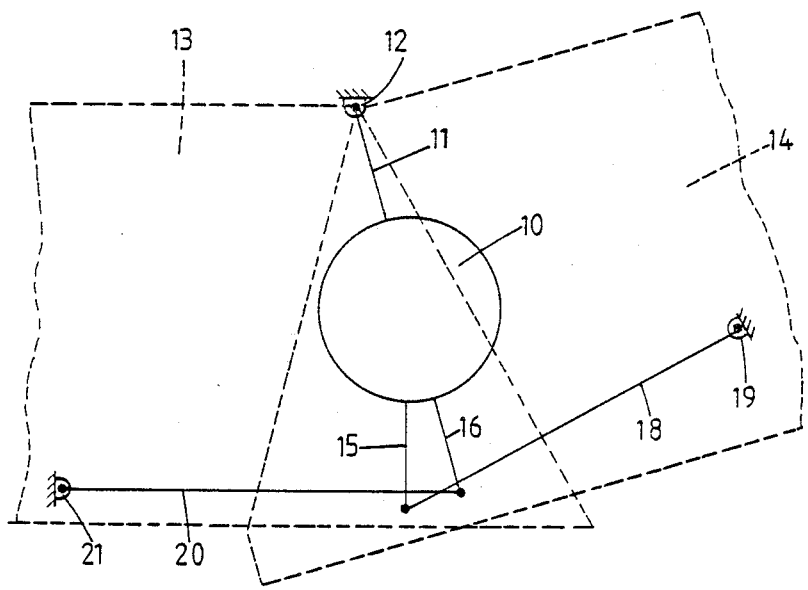
Figure 3:
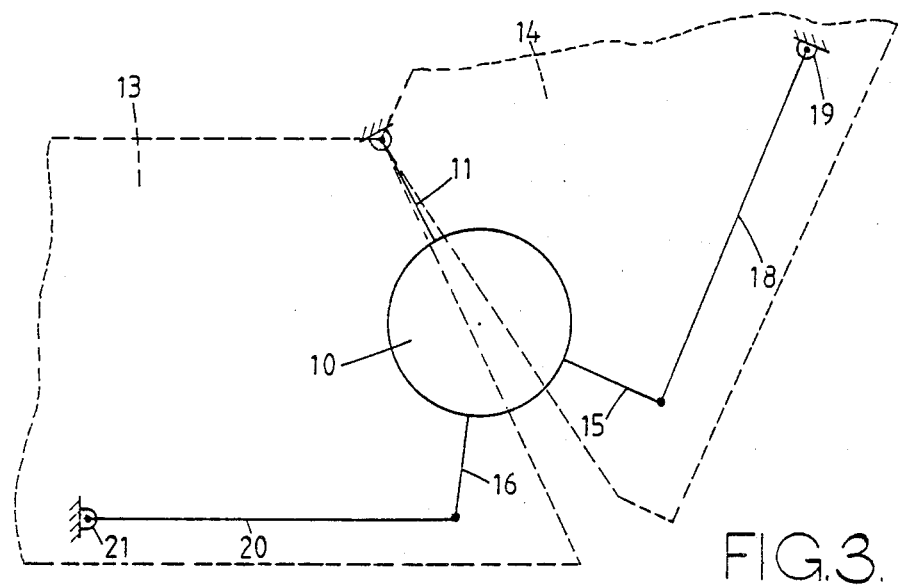

United States Patent [19]

McKay

[11] Patent Number: 4,768,400
[45] Date of Patent: Sep. 6, 1988

[54] GEARED ACTUATOR ARRANGEMENT

[75] Inventor: Richard J. McKay, Wolverhampton, England

[73] Assignee: Lucas Industries Public Limited Company, Birmingham, England

[21] Appl. No.: 908,256

[22] Filed: Sep. 17, 1986

[30] Foreign Application Priority Data

Sep. 21, 1985 [GB] United Kingdom ............... 8523382
Oct. 11, 1985 [GB] United Kingdom ............... 8525098

[51] Int. Cl.$^4$ .............................................. F16H 1/28
[52] U.S. Cl. ...................................... 74/801; 74/674; 74/768
[58] Field of Search ............ 74/768, 801, 674, 665 H, 74/665 S, 665 F, 750 R, 665 K, 805

[56] References Cited

U.S. PATENT DOCUMENTS

| 2,053,130 | 9/1936 | Cheyne | 74/801 |
| 2,703,021 | 3/1955 | Stoeckicht | 74/801 X |
| 2,944,444 | 7/1960 | Burns | 74/801 |
| 2,966,808 | 1/1961 | Grudin | 74/801 X |
| 3,008,355 | 11/1961 | Grudin | 74/801 |
| 3,120,761 | 2/1964 | Pravel | 74/25 |
| 3,203,275 | 8/1965 | Hoover | 74/801 X |
| 3,234,821 | 2/1966 | Himmel et al. | 74/768 |
| 3,640,150 | 2/1972 | Leiner et al. | 74/674 |
| 4,391,163 | 7/1983 | Benthake et al. | 74/768 |
| 4,578,993 | 4/1986 | Burandt | 74/674 X |

FOREIGN PATENT DOCUMENTS 3205208 9/1983 Fed. Rep. of Germany .
WO8600968 2/1986 PCT Int'l Appl. ................. 74/768

Primary Examiner—Leslie A. Braun
Assistant Examiner—David Novais
Attorney, Agent, or Firm—Leydig, Voit & Mayer

[57] ABSTRACT

An actuator arrangement includes epicyclic gearing having compound planetary gears each of whose pinions respectively mesh with a ring gear on a relatively fixed body and with two output ring gears to drive the latter in opposite directions relative to the body. The pinions which mesh with the ring gear on the body are free to rotate with respect to the remaining pinions and also mesh with a sun gear which is separate from, but driven by, the sun gear which drives the remaining pinions. The arrangement permits the gearing to overcome dimensional restraints imposed by prior art systems.

6 Claims, 3 Drawing Sheets

GEARED ACTUATOR ARRANGEMENT

This invention relates to a geared actuator arrangement particularly intended for angularly moving parts of an articulated structure relative to one another.

It has already been proposed to construct a compound planetary gear arrangement within a tubular body of a hinge, which gear arrangement is driven by a suitable motor to displace one part of the hinge body relative to another part about the common axis of these parts. In this way it has been found possible to provide a very substantial reduction ratio whilst keeping the overall dimensions of the hinge body relatively small. One such geared hinge construction is to be found disclosed in U.S. Pat. No. 3640150, and provides an arrangement by means of which two output elements can be driven simultaneous in opposite directions with respect to a relatively stationary body. This result is obtained by providing that the pinions of compound planetary gears which mesh with ring gears on the respective output elements have additional portions which mesh with a ring gear on the relatively stationary body.

It is a disadvantage of the prior art arrangement that the additional pinion portions are integral with and driven by the remaining pinions on the compound planetary gears. Such an arrangement can give rise to problems of assembly if the additional pinion portions have pitch circle diameters which are larger than those of other pinions on the planetary gears, since it may then be difficult or impossible to pass an output ring gear over the additional pinion portions. The dimensional constraints imposed by this difficulty limit the ratios of the speeds of the output elements relative to the body.

It is an object of the present invention to provide a geared actuator arrangement in which the foregoing problem is overcome.

According to the invention a geared actuator arrangement comprises a body, a first sun gear rotatable relative to said body, first and second ring gears relative to each other each of which is rotatable relative to said body and a plurality of compound planet gears, each of said planet gears comprising axially aligned first and second pinions which are fast on a common shaft for rotation in unison, the number of teeth on said first pinion being different from the number of teeth on said second pinion, one of said pinions meshing with said first sun gear and with said first ring gear and the other of said pinions meshing with said second ring gear, a third gear coupled to said body for rotation therewith, a second sun gear coupled to said first sun gear for rotation thereby, each of said compound planet gears supporting a third pinion which is coaxial with said first and second pinions and is freely rotatable relative thereto, said third pinion meshing with said third ring gear and said second sun gear.

Figure 4:
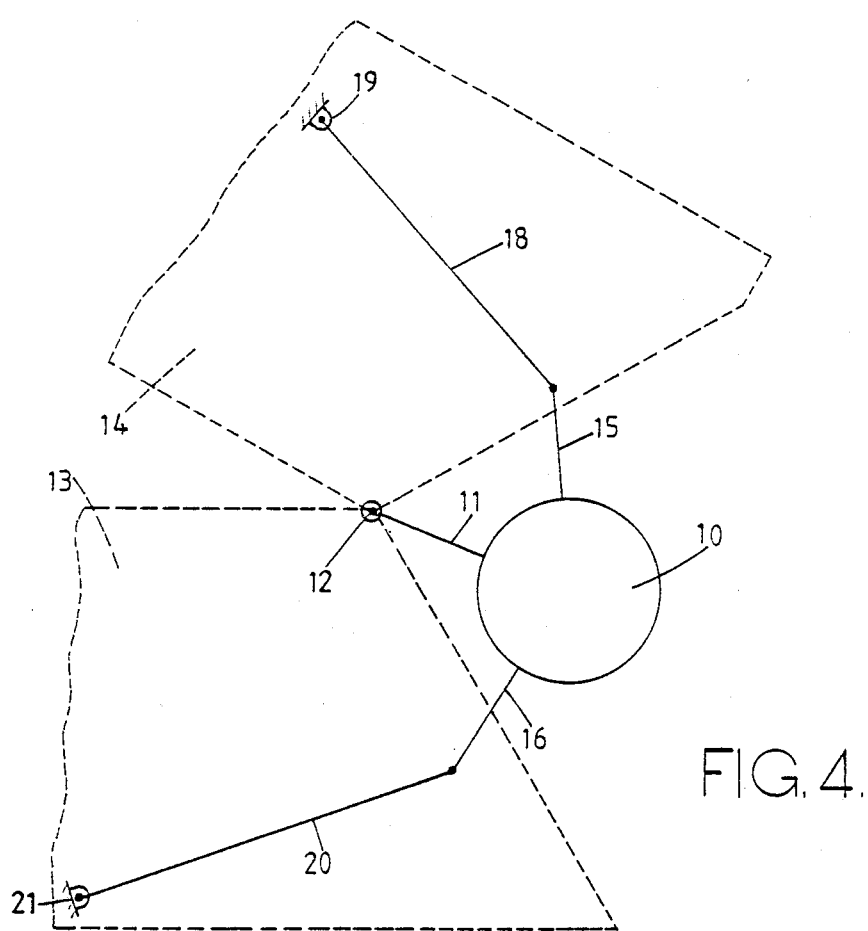
Figure 5:
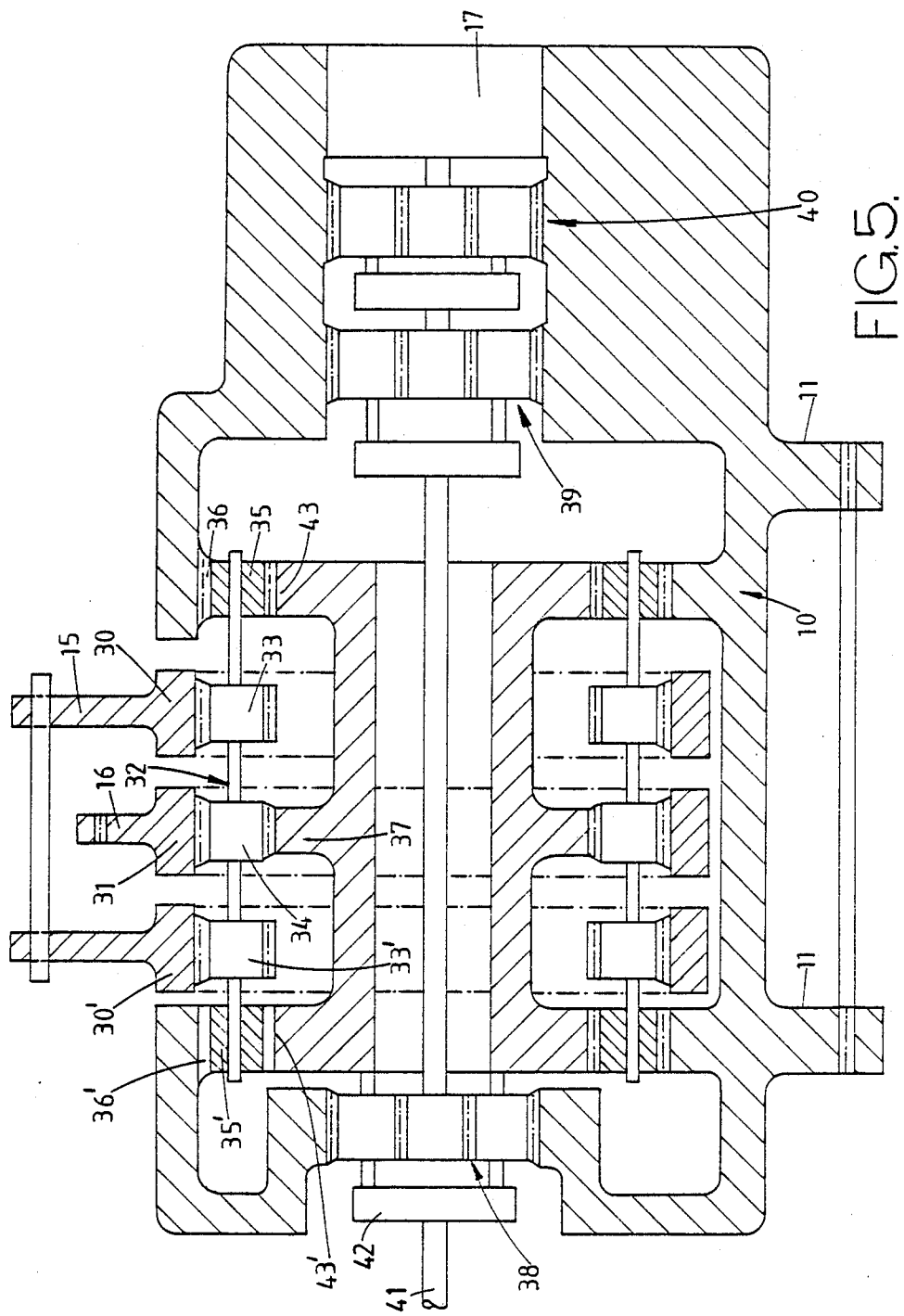

An embodiment of the invention will now be described by way of example only and with reference to the accompanying drawings in which:

FIGS. 1 to 4 are diagrammatic views showing a joint between parts of an articulated aircraft wing, in four successive operating positions, and FIG. 5 is a diagrammatic cross-section through a compound gear arrangement forming part of the joint of FIGS. 1 to 4.

As shown in FIGS. 1 to 4 the compound gear arrangement includes a body 10 on which there is a mounting arm 11. This arm 11 is pivotally supported coaxially with a hinge 12 which interconnects two parts 13, 14 of an articulated structure. The axis 10A of the body 10 is spaced from and parallel to the axis of the hinge 12. The gear arrangement has two output arms 15, 16 which turn in opposite directions relative to the body 10 when a motor mounted on the body 10 is operated. As explained in detail in the following description of FIG. 5, the various gear ratios of the gear arrangement are such that the two output arms 15 and 16 turn in opposite directions at approximately equal speeds about the axis 10A.

The arm 15 is connected by a link 18 to a bracket 19 on the part 14, whereas the arm 16 is connected by a link 20 to a bracket 21 on the part 13. The two linkages constituted by the arm 15 and the link 18 and by the arm 16 and the link 20 are substantially identical and symmetrical, although minor asymmetries may be required to enable the linkages to be stowed.

FIG. 1 shows the parts 13, 14 in a position of use, in which the two linkages overlap one another within the confines of the two parts 13, 14, which, in this condition, have substantially contiguous outer surfaces. When the drive motor is operated the turning of the two output arms 15, 16 causes the linkages to move out of their overlapping positions to increase the distance between the brackets 19, 21 and, with the part 13 fixed, move the part 14 anticlockwise as viewed in the drawings.

In the final position shown in FIG. 4 each of the output arms 15, 16 has been turned through an angle of slightly less than 180° relative to the body and the part 14 has turned through approximately the same angle.

It will be seen that in each of the positions shown the arm 11 lies approximately along the bisector of the angle between the arms 15, 16, that is the linkages 15, 18 and 16, 20 are substantially symmetrically arranged about the arm 11.

This symmetry and the choice of gear ratios to cause turning of the arms 15, 16 through roughly equal angles ensures that side loads on the arm 11 and the hinge 12 are minimised enabling the arm 11 to be lightly constructed as compared with the arms 15 and 16.

Turning now to FIG. 5, it will be seen that the arms 15 and 16 are provided on first and second internal ring gears 30, 31. In fact, two of the first ring gears 30, 30' are provided and these are disposed on opposite sides of the ring gear 31. The gears 30, 30' are coupled together. This arrangement distributes and balances the effect of output loads on the assembly as a whole.

A plurality of compound planet gears 32 are provided and each of these includes two pinions 33, 33' which engage gears 30, 30' respectively, and a pinion 34, which engages gear 31. The pinions 33, 33', 34 are either integral or constituted by separate gears secured together in any convenient manner for rotation in unison. The pinion 34 of the compound planet gears 32 also meshes with a sun gear 37. Two sets of further pinions 35; 35' are mounted for free rotation on spindles of the compound planet gears 32 and mesh with respective sun gears 43, 43' which are constrained to rotate with the sun gear 37. The pinions 35, 35' also mesh with internal ring gears 36, 36' respectively on the body 10.

The sun gears 37, 43, 43' are integral with or secured to the planet pinion carrier of a conventional epicyclic reduction gear train 38, the sun gear of which is driven by the planet pinion carrier of another such gear train 39. The sun gear of gear train 39 is likewise driven by the planet pinion carrier of a third epicyclic reduction gear train 40, the sun gear of which is driven by the shaft of motor 17. The internal ring gears of all three gear trains 38, 39, 40 are integral with or secured to the body 10. Each of the gear trains 38, 39, 40 is a 3.631:1 reduction gear train so that the three gear trains provide a 47.871:1 reduction.

In the specific example described gear 30, 30' and 31 each have 47 teeth and there are 54 of the internal teeth 36 on the body. Pinions 33 and 33' of each compound pinion have 12 teeth and pinions 34 have 13 teeth. The pinions 35 have 16 teeth. The sun gear 37 has 19 teeth and the sun gears 43, 43' have 21 teeth. With these tooth ratios, the reduction ratio between sun gear 37 and ring 30 (assuming the body 10 to be stationary) is +88.295 and the reduction ratio between the sun gear 37 and the ring gear 31 is −90.385. Thus if the body 10 is stationary and the motor 17 is driven at 6,000 rpm the ring gears 30, 30' rotate at +1.4188 rpm and ring gear 31 rotates in the reverse direction at −1.3860 rpm.

The pinions 35, 35' rotate at approximately 0.9 times the speeds of the planet pinion gears 32, whereby with the motor 17 driven at 6,000 rpm the pinions 35, 35' rotate at about 24 rpm relative to the gears 32. Wear between the pinions 35, 35' and stub shafts of the gears 32 is minimal and plain bearings may be used.

Though equality of the reduction ratios between the sun gear 37 and the ring gears 30, 31 is desirable, in practice the restraints imposed by the design and number of teeth in each gear, in order to obtain the necessary speed reduction from the motor and to facilitate assembly, result, in a practical construction in the difference between the above rotational speeds relative to the body 10.

A plurality of additional arrangements each having a housing 10 and gear trains 30–37 and 43 may be coupled in axial alignment with the arrangement shown in Figure 5, and be driven by the motor 17. For this purpose a shaft 41 of the carrier 42 of the gear train 38 is coupled directly to the sun gear 37 of the next adjacent arrangement. The bodies 10 of the arrangements are drivingly coupled together, as are the arms 15 and 16 to corresponding arms in the other arrangements.

The ease of assembly provided by the free pinions 35, 35' has the effect that these may readily be mounted, as shown, at opposite ends of the gears 32 even if their pitch circle diameters are substantially different from those of the pinions 33, 34. Typically six equiangularly spaced gears 32 are provided. In view of the small side loads on the arms 11 it is possible to arrange that the pinions 35, 35' are provided on only three of the gears 32.

I claim:

1. A geared actuator arrangement having three ouput elements which are simultaneously relatively movable with fixed gear ratios therebetween and comprising a body, a first sun gear rotatable relative to said body, first and second ring gears rotatable relative to each other, each of which is rotatable relative to said body, and a plurality of compound planet gears, each of said planet gears comprising axially aligned first and second pinions which are fixed on a common shaft for rotation in unison, the number of teeth on said first pinion being different from the number of teeth on said second pinion, one of said pinions meshing with said first sun gear and with said first ring gear and the other of said pinions meshing with said second ring gear, a third ring gear fixedly secured to said body for rotation therewith, a second sun gear coupled to said first sun gear for rotation thereby, each of said compound planet gears supporting a third pinion which is coaxial with said first and second pinions and is freely rotatable relative thereto, said third pinion meshing with said third ring gear and said second sun gear, said first and second ring gears and said body providing said three output elements and having means for securing to respective parts of an articulated structure.

2. A geared actuator arrangement comprising a body, a first sun gear rotatable relative to said body, first and second ring gears rotatable relative to each other, each of which is rotatable relative to said body, and a plurality of compound planet gears, each of said planet gears comprising axially aligned first and second pinions which are fixed on a common shaft for rotation in unison, the number of teeth on said first pinion being different from the number of teeth on said second pinion, one of said pinions meshing with siad first sun gear and with said first ring gear and the other of said pinions meshing with said second ring gear, a pair of third ring gears coupled to said body for rotation therewith and axially spaced on opposite sides of said first and second ring gears, a pair of second sun gears coupled to said first sun gear for rotation thereby and aligned with respective ones of said third ring gears, each of said compound planet gears supporting a pair of third pinions which are coaxial with said first and second pinions and are freely rotatable relative thereto, said third pinions meshing with respective ones of said third ring gears and said second sun gears.

3. An actuator arrangement as claimed in claim 2 which includes a motor mounted in said body and epicyclic reduction gearing coupling said motor to said first sun gear.

4. An actuator arrangement as claimed in claim 2 which includes means for mounting said body for movement about a hinge axis between two articulated parts so that the axis of said body is in spaced parallel relationship with said hinge axis, and linkages connecting said first and second ring gears to respective ones of said parts.

5. An actuator arrangement as claimed in claim 2 which includes a motor mounted in said body and epicyclic reduction gearing coupling said motor to said first sun gear.

6. An actuator arrangement as claimed in claim 2 which includes means for mounting said body for movement about a hinge axis between two articulated parts so that the axis of said body is in spaced parallel relationship with said hinge axis, and linkages connecting said first and second ring gears to respective ones of said parts.

* * * * *